US006930802B2

(12) United States Patent
Sugaya et al.

(10) Patent No.: US 6,930,802 B2
(45) Date of Patent: Aug. 16, 2005

(54) IMAGE RECORDING APPARATUS

(75) Inventors: Toyoaki Sugaya, Hachioji (JP); Fujio Miyamoto, Hachioji (JP); Takashi Tsutsumi, Hachioji (JP); Minoru Maekawara, Hachioji (JP); Kenichiro Hiramoto, Hachioji (JP)

(73) Assignee: Konica Corporation (JP)

(*) Notice: Subject to any disclaimer, the term of this patent is extended or adjusted under 35 U.S.C. 154(b) by 835 days.

(21) Appl. No.: 09/843,510

(22) Filed: Apr. 25, 2001

(65) Prior Publication Data

US 2001/0035978 A1 Nov. 1, 2001

(30) Foreign Application Priority Data

Apr. 28, 2000 (JP) ....................................... 2000-129983

(51) Int. Cl.[7] .................................................. H04N 1/21

(52) U.S. Cl. ....................... 358/296; 358/1.15; 358/1.9; 242/418.1; 270/52.01

(58) Field of Search ............................. 358/418.1, 304, 358/296, 302, 1.15, 474, 498, 1.9; 270/52.01; 242/418; 400/621, 215, 544, 593, 621.1; 396/134, 136

(56) References Cited

U.S. PATENT DOCUMENTS 4,611,799 A * 9/1986 Nuttin ..................... 270/52.01
5,268,766 A * 12/1993 Nakadai et al. ............. 358/296
5,707,024 A * 1/1998 Mellquist et al. ........ 242/418.1
5,829,897 A * 11/1998 Murai ..................... 400/615.2
6,141,115 A * 10/2000 Naruse ....................... 358/1.9
6,164,851 A * 12/2000 Sakamoto et al. .......... 400/207
6,281,981 B1 * 8/2001 Yasui et al. ................ 358/1.15

* cited by examiner

*Primary Examiner*—Edward Coles
*Assistant Examiner*—Heather D. Gibbs
(74) *Attorney, Agent, or Firm*—Cantor Colburn LLP

(57) ABSTRACT

The present invention concerns an image recording apparatus, which records images on a roll-type recording medium. The image recording apparatus includes a recording device to record an image on a recording medium by emitting ink onto the recording medium; a cutting member to cut the recording medium after the recording device records the image, the cutting member being disposed downstream in respect to the recording device in a conveying-direction of the recording medium; a second conveyance member to convey the recording medium, the second conveyance member being disposed at a position located between the recording device and the cutting member in the conveying-direction of the recording medium; and a conveyance controller to control the second conveyance member so as to generate a slack of the recording medium at a section between the recording device and the second conveyance member in the conveying-direction of the recording medium.

49 Claims, 12 Drawing Sheets

IMAGE RECORDING APPARATUS

BACKGROUND OF THE INVENTION

The present invention relates to an image recording apparatus, and in particular, to an image recording apparatus wherein images are recorded on a long recording medium, for example, on a recording medium wound to be in a roll shape, and the recording medium on which images have been recorded is cut to be a sheet.

FIG. 20 is a structure diagram of a conventional image recording apparatus. In the diagram, an arrangement is made so that recording medium 1000 wound to be in a roll shape may be nipped by paired rollers 1003 representing a conveyance means to be conveyed in the direction of arrow I.

On the downstream side of the paired rollers 1003, there is provided recording means 1020, which conducts recording by jetting ink in the direction of a width of recording medium 1000. The recording means 1020 representing the conventional example is composed of recording head 1021 that jets ink and of carriage 1002 that conveys the recording head 1021 in the direction (lateral direction for recording medium: direction perpendicular to the page in the diagram) perpendicular to the conveyance direction for recording medium 1000.

On the downstream side of the recording means 1020, there is provided ink drying means 1007 that dries ink jetted on recording medium 1000.

Further, on the side opposite to an image recording surface on the recording medium 1000, there is provided suction means 1006 which faces the recording means 1020 and attracts the recording medium 1000 to prevent that the recording medium 1000 is lifted in the course of image recording.

On the downstream side of the ink drying means 1007, there are provided cutter 1005 which cuts the recording medium 1000 and sheet ejection tray 1008 which stores recording medium 1000 which has been cut.

Next, operations of the structure stated above will be explained as follows.

Because of movement of the carriage 1002 in the lateral direction of recording medium 1000, a linear image is recorded in the lateral direction on the recording medium 1000.

After the linear image is recorded, the paired roller 1003 are driven, and the recording means 1020 is moved for a prescribed length in the direction of arrow I.

Then, owing to movement of the carriage 1002 in the lateral direction of recording medium 1000, a linear image is recorded again in the lateral direction on the recording medium 1000.

When the aforesaid operations are repeated, an image is recorded on recording medium 1000.

After recording of an image has been completed, recording medium 1000 is fed out by paired rollers 1003 in the direction of arrow I until the trailing edge of the recorded image comes to the position that faces cutter 1005.

Then, the cutter 1005 cuts the vicinity of the trailing edge of the image, and sheet-shaped recording medium 1000 is ejected on sheet ejection tray 1008.

After the recording medium 1000 is cut, the paired rollers 1003 rotates in the direction opposite to that in the previous cycle, and thereby, the leading edge of the recording medium 1000 is brought back to the position facing recording means 1020, and the succeeding image recording is carried out.

In an image recording apparatus having the abovementioned structure, after an image has been recorded, recording medium 1000 is fed out until the trailing edge of the recorded image comes to the position facing cutter 1005, then, the recording medium is cut and the leading edge of the recording medium 1000 is brought back to the position facing recording means 1020.

Namely, there is a problem that the recording medium 1000 needs to be fed out and needs to be brought back when it is cut, and image recording cannot be carried out during that period of feeding out and bringing back, which makes the processing time to be long.

Further, when a recording head having a large number of nozzles is used, a length (sub-scanning length) by which the recording medium is moved in the direction of arrow I for a prescribed quantity after a linear image has been recorded turns out to be longer. Therefore, when a small-sized image is recorded, a rate of processing time for cutting is increased, and a rate of non-image-recording is increased accordingly.

Further, a configuration of image-recording apparatus, in which a cutter attached to the carriage of the recording means is utilized for cutting the recording medium in the vicinity of the end portion of the image, may be applicable other than the aforementioned image-recording apparatus. In such the configuration, however, it is impossible to arbitrarily adjust a width of a blank space.

SUMMARY OF THE INVENTION

To overcome the abovementioned drawbacks in conventional image-recording apparatus, it is an object of the present invention to provide image-recording apparatus, in which a processing time is shortened.

Accordingly, to overcome the cited shortcomings, the abovementioned object of the present invention can be attained by image-recording apparatus described as follow.

(1) An image recording apparatus, comprising: a recording device to record an image on a recording medium by emitting ink onto the recording medium; a cutting member to cut the recording medium after the recording device records the image, the cutting member being disposed downstream in respect to the recording device in a conveying-direction of the recording medium; a second conveyance member to convey the recording medium, the second conveyance member being disposed at a position located between the recording device and the cutting member in the conveying-direction of the recording medium; and a conveyance controller to control an operation for driving the second conveyance member so as to generate a slack of the recording medium at a section between the recording device and the second conveyance member in the conveying-direction of the recording medium.

(2) An image recording apparatus, comprising: a recording device to record an image on a recording medium by emitting ink onto the recording medium; a cutting member to cut the recording medium after the recording device records the image; and an accumulating section to temporarily accumulate the recording medium on which the image is already recorded by the recording device, the accumulating section being disposed at a position located between the recording device and the cutting member.

Further, to overcome the abovementioned problems, structures of other image-recording apparatus, embodied in the present invention, will be described as follow:

Structure (1)

An image recording apparatus characterized in that a recording means (a recording device) that conducts recording on a recording medium, a cutting means (a cutting member) that cuts a recording medium on which the recording has been carried out by the recording means and a conveyance means (a conveyance member) that is provided between the recording means and the cutting means and conveys the recording medium are provided therein.

Because of the aforesaid arrangement wherein the conveyance means is provided between the recording medium and the cutting means, it is possible to cut the recording medium without stopping operations of the image recording, and processing time is shortened accordingly.

Structure (2)

The image recording apparatus according to Structure (1), characterized in that the image recording means conducts recording by jetting ink.

By applying the invention in Structure (1) to the recording means that conducts recording by jetting ink, it is possible to cut the recording medium without stopping operations of the image recording, and processing time is shortened accordingly.

Structure (3)

The image recording apparatus according to Structure (1) or Structure (2), characterized in that a cutting position control means (a cutting-position controller) which controls a cutting position at which the recording medium is cut by the cutting means is provided.

Because of the aforesaid arrangement wherein the cutting position control means which controls a cutting position for the cutting means is provided, it is possible to cut the recording medium without stopping operations of the image recording, and processing time is shortened accordingly.

Structure (4)

The image recording apparatus according to Structure (3), characterized in that the cutting position control means controls driving of the conveyance means.

By controlling the driving for the conveyance means with the cutting position control means, it is possible to cut the recording medium without stopping operations of the image recording, and processing time is shortened accordingly.

Structure (5)

The image recording apparatus according to Structure (3) or Structure (4), characterized in that a cutting position detection means (a cutting position detector) which detects a cutting position is provided, and the cutting position control means controls the cutting position based on information from the cutting position detection means.

By controlling the cutting position with information from the cutting position detection means, it is possible to cut the recording medium without stopping operations of the image recording, and processing time is shortened accordingly.

Structure (6)

The image recording apparatus according to Structure (5), characterized in that the cutting position detection means detects an amount of conveyance of the conveyance means.

Because of the aforesaid arrangement wherein the cutting position detection means detects an amount of conveyance of the conveyance means, and the cutting position control means controls the cutting position based on information from the cutting position detection means, it is possible to cut the recording medium without stopping operations of the image recording, and processing time is shortened accordingly.

Further, since a means to specify a cutting position on a recording medium is not needed, such means to specify the cutting position on the image recording surface of a recording medium is eliminated, thereby, the beauty on the image recording surface is not spoiled and cost reduction can further be achieved.

Structure (7)

The image recording apparatus according to Structure (5) or Structure (6), characterized in that the cutting position detection means includes a leading edge detection means that detects the leading edge of the recording medium.

Because of the aforesaid arrangement wherein the cutting position detection means includes the leading edge detection means that detects the leading edge of the recording medium, and the cutting position control means controls the cutting timing for the cutting means based on results of detection by the leading edge detection means, it is possible to cut the recording medium without stopping operations of the image recording, and processing time is shortened accordingly.

Further, since a means to specify a cutting position on a recording medium is not needed, such means to specify the cutting position on the image recording surface of a recording medium is eliminated, thereby, the beauty on the image recording surface is not spoiled and cost reduction can further be achieved.

Structure (8)

The image recording apparatus according to Structure (7), characterized in that a plurality of leading edge detection means corresponding to a size of an image to be recorded are provided.

Because of a plurality of leading edge detection means provided to correspond to a size of an image to be recorded, it is possible to cut at an accurate position even for recording media each having a different size.

Structure (9)

The image recording apparatus according to either one of Structures (5)–(8), characterized in that the cutting position detection means detects a cutting-position designating mark, serving as a cutting position specifying means, provided on the recording medium.

Because of the aforesaid arrangement wherein the cutting position control means controls the cutting position based on the results of the detection conducted by the cutting position detection means for the cutting position designating mark, it is possible to cut the recording medium without stopping operations of the image recording, and processing time is shortened accordingly.

Structure (10)

The image recording apparatus according to Structure (9) characterized in that the cutting position designating mark is recorded on the recording medium in the course of recording.

Because of the aforesaid arrangement wherein the cutting position designating mark is recorded on the recording medium in the course of image recording, and the cutting position detection means controls the cutting position based on the results of the detection conducted by the cutting position control means for the cutting position designating mark, it is possible to cut the recording medium without stopping operations of the image recording, and processing time is shortened accordingly.

Further, by recording the cutting position designating mark in the course of image recording, it is possible to control the cutting position by conforming to a size of an image without using a specific recording medium.

Structure (11)

The image recording apparatus according to Structure (9, characterized in that the cutting position designating mark is recorded on the recording medium in advance.

Because of the aforesaid arrangement wherein the cutting position control means controls the cutting position based on the results of the detection conducted by the cutting position detection means for a cutting position supporting means recorded on the recording medium in advance, it is possible to cut the recording medium without stopping operations of the image recording, and processing time is shortened accordingly.

Because of the aforesaid arrangement wherein the cutting position designating mark is recorded on the recording medium in advance, it is possible to control the cutting position without requiring unnecessary time in the course of image recording.

Structure (12)

The image recording apparatus according to either one of Structures (9)–(11), characterized in that the cutting position designating mark is a prescribed pattern that absorbs wavelengths, which are out of visible light.

Because of the aforesaid arrangement wherein the cutting position designating mark is a prescribed pattern that absorbs wavelengths which are out of visible light, namely is a pattern which is invisible, even a cutting position designating mark is provided on an image recording surface, an image is not affected.

Structure (13)

The image recording apparatus according to either one of Structures (9)–(12), characterized in that the cutting position designating mark is provided on the side of the recording surface of the recording medium.

When the cutting position designating mark is recorded on the side of the recording surface of the recording medium, it is possible to use the recording means, which enables cost reduction.

Structure (14)

The image recording apparatus according to either one of Structures (9)–(13), characterized in that the cutting position designating mark is provided on the side which is opposite to the side of the recording surface of the recording medium.

When the cutting position designating mark is provided on the side which is opposite to the side of the recording surface of the recording medium, an image is not affected and much information other than the cutting position designating mark can be recorded.

Structure (15)

The image recording apparatus according to either one of Structures (9)–(14), characterized in that the cutting position designating mark is recorded by an information recording means.

By recording the cutting position designating mark with the information recording means, it is possible to control the cutting position without using a specific recording medium.

Incidentally, the information recording means includes an ink jet method, a fusion thermal transfer method, a sublimation thermal transfer method and a dot-impact method, and there is no restriction.

Structure (16)

The image recording apparatus according to either one of Structures (9)–(15), characterized in that the cutting means cuts a recording medium at two positions before and behind the cutting position designating mark.

Because of the aforesaid arrangement wherein the recording medium is cut at two positions before and behind the cutting position designating mark, it is possible to remove the cutting position designating mark from the recording medium on which an image has been recorded, and to make a print having no margin.

Structure (17)

The image recording apparatus according to either one of Structures (9)–(16), characterized in that the cutting means cuts the recording medium at two positions continuously.

Because of the aforesaid arrangement wherein the cutting means cuts the recording medium at two positions continuously, namely, the cutting means cuts twice on a basis of one position at a time, the number of cutting blades has only to be one, which results in low cost.

Structure (18)

The image recording apparatus according to either one of Structures (9)–(17), characterized in that the cutting means cuts the recording medium at two positions simultaneously.

Because of the aforesaid arrangement wherein the cutting means cuts the recording medium at two positions simultaneously, namely, the cutting means cuts at two positions simultaneously, the time required for cutting can be short.

Structure (19)

The image recording apparatus according to either one of Structures (16)–(18), characterized in that the cutting position control means changes a distance between cutting positions before and behind the cutting position designating mark depending on a size of an image to be recorded.

The cutting position control means corrects an error of cutting position due to an accumulated error of a conveying amount, by adjusting the interval distance between cutting positions before and behind the cutting position designating mark at appropriate times while taking a size of an image to be recorded into account.

Structure (20)

The image recording apparatus according to either one of Structures (9)–(19), characterized in that the distance stated above is changed in accordance with a size of the cutting position designating mark, sizes of patterns provided before and behind the cutting position designating mark, and with a size of an image on which at least one of sizes of non-recording areas provided before and behind the cutting position designating mark is recorded.

To prevent confusion between the cutting position designating mark and an image, non-recording zones are provided before and behind the cutting position designating mark and a distance from the immediately preceding cutting position designating mark is stored in the course of recording of a cutting position detection means, to predict that the cutting position designating mark arrives at the position of the cutting position detection means. The cutting position designating mark detected in the vicinity of the predicted position only is used as a standard for a cutting position, and those other than that are judged as a part of the image.

On the other hand, an error representing a difference between the predicted position for the cutting position designating mark to appear and the position detected actually results usually from accuracy in an amount of conveyance of a conveyance means, and the greater an amount of conveyance for a recording medium is, the greater the error is.

As an example, when an error of ±1% of a conveyance amount is caused, a conveyance error of ±1 mm is caused in conveyance for 100 mm. Therefore, when non-recording areas each being 1 mm in size are provided before and behind the cutting position designating mark, it is possible to conclude that a cutting position designating mark detected within a space of 1 mm before or behind the predicted position for the cutting position designating mark to appear is not an image but is a cutting position designating mark.

When conveying by 200 mm, a conveyance error of ±2 mm can be caused. Therefore, when non-recording areas each being 2 mm in size are provided before and behind the cutting position designating mark, it is possible to conclude that a cutting position designating mark detected within a space of 2 mm before or behind the predicted position for the cutting position designating mark to appear is not an image but is a cutting position designating mark.

Incidentally, it is also possible to obtain the same effect by providing prescribed patterns in place of non-recording areas before and behind the cutting position designating mark, or by changing a size of the cutting position designating mark itself.

By changing in accordance with a size of an image on which at least one of a size of a cutting position designating mark, sizes of patterns provided before and behind the cutting position designating mark, and sizes of non-recording areas provided before and behind the cutting position designating mark is recorded, it is possible to cut at the position which is surely located between images.

Structure (21)

An image recording apparatus characterized in that a recording means that conducts recording on a recording medium, a cutting means that cuts the recording medium on which recording has been conducted by the recording means, and an accumulating means that is provided between the recording means and the cutting means and accumulates temporarily the recording medium subjected to recording, are provided.

Because of the aforesaid arrangement wherein the accumulating means that accumulates temporarily the recording medium subjected to recording, it is possible to cut the recording medium without stopping image forming operations, which shortens the processing time.

Structure (22)

The image recording apparatus according to Structure (21), characterized in that the accumulating means has a roller provided at a fixed position and a roller provided variably in terms of position.

Because of the aforesaid arrangement wherein the roller provided variably in terms of position is moved in accordance with slack of a recording medium, it is possible to adjust a remaining quantity of the recording medium, and to detect how much the recording medium is slacked.

Structure (23)

The image recording apparatus according to Structure (22), characterized in that a pressurizing means which applies pressure on the roller provided variably in terms of position is provided.

Because of the pressurizing means applying pressure on the roller provided variably in terms of position, the roller provided variably in terms of position can follow the slack of a recording medium accurately.

Structure (24)

The image recording apparatus according to either one of Structures (21)–(23), characterized in that a slack amount detection means that detects an amount of slack of the recording medium is provided on the accumulating means.

For example, by providing a position detection sensor that detects a position of the roller having variable positions, it is possible to detect a remaining amount.

Structure (25)

The image recording apparatus according to either one of Structures (24), characterized in that the recording by the recording means is suspended temporarily when an amount of slack of a recording medium detected by the slack amount detection means comes to a prescribed amount or more.

When an amount of slack of a recording medium detected by the slack amount detection means comes to a prescribed amount or more, it is possible to prevent over slack of a recording medium in the accumulating means by suspending the recording by the recording means temporarily.

Structure (26)

The image recording apparatus according to Structure (24) or Structure (25), characterized in that cutting of the recording medium conducted by the cutting means is suspended temporarily when an amount of slack of the recording medium detected by the slack amount detection means comes to a prescribed amount or less.

When cutting of the recording medium by the cutting means is suspended temporarily when an amount of slack of the recording medium detected by the slack amount detection means comes to a prescribed amount or less, there is no influence on recording in the recording means.

Structure (27)

The image recording apparatus according to either one of Structure (21)–Structure (26), characterized in that the recording means jets ink for recording.

By applying the invention described in either one of Structures (21)–(26) to the recording means that jets ink of slow output for recording, it is possible to cut a recording medium without stopping image forming operations, and processing time is shortened accordingly.

Structure (28)

An image recording apparatus characterized in that a recording means that conducts recording on a recording medium, a cutting means that is provided at the downstream side of the recording means and cuts the recording medium, a second conveyance means that is provided between the recording means and the cutting means and conveys the recording medium, a first conveyance means that is provided at the upstream side of the second conveyance means and conveys the recording medium, and a conveyance control means that controls the second conveyance means so that the recording medium may be slackened between the first conveyance means and the second conveyance means, are provided.

By providing the conveyance control means that controls the second conveyance means so that the recording medium may be slackened between the first conveyance means and the second conveyance means, it is possible to cut the recording medium without stopping operations of the image recording, and processing time is shortened accordingly.

Structure (29)

The image recording apparatus according to Structure (28), characterized in that the conveyance control means controls the first conveyance means.

Because of the conveyance control means controlling the first conveyance means, excellent images can be recorded on the recording medium.

Structure (30)

An image recording apparatus characterized in that a recording means that conducts recording on a recording medium, a cutting means that is provided at the downstream side of the recording means and cuts the recording medium, a second conveyance means that is provided between the recording means and the cutting means and conveys the recording medium, a first conveyance means that is provided at the upstream side of the second conveyance means and conveys the recording medium, and a conveyance control means that controls the first conveyance means and the second conveyance means, are provided, and the conveyance control means conducts the first control for controlling the first and second conveyance means so that the recording medium may be slackened between the first conveyance means and the second conveyance means, and the second control for absorbing the slack of the recording medium.

Because of the conveyance control means that conducts the first control for controlling the first and second conveyance means so that the recording medium may be slackened between the first conveyance means and the second conveyance means, and the second control for absorbing the slack of the recording medium, it is possible to cut the recording medium without stopping operations of the image recording, and processing time is shortened accordingly.

Structure (31)

The image recording apparatus according to either one of Structures (28)–(30), characterized in that the conveyance control means controls the conveyance speed of the second conveyance means.

Because of the conveyance control means that controls an amount of conveyance of the second conveyance means, it is possible to slacken the recording medium at the upstream side of the second conveyance means.

Structure (32)

The image recording apparatus according to either one of Structures (28)–(30), characterized in that the conveyance control means controls conveyance timing of the second conveyance means.

Because of the arrangement wherein the conveyance control means controls conveyance timing of the second conveyance means, a recording medium can be cut without stopping image recording operations, which makes processing time to be short.

Structure (33)

The image recording apparatus according to either one of Structures 28–32, characterized in that the recording means jets ink for recording.

When the invention described in either one of Structures 28–32 is applied to the recording means which jets ink with slow output for recording, a recording medium can be cut without stopping image recording operations, which makes processing time to be short.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT (1) First Embodiment (General Mechanical Structure)

Figure 1:
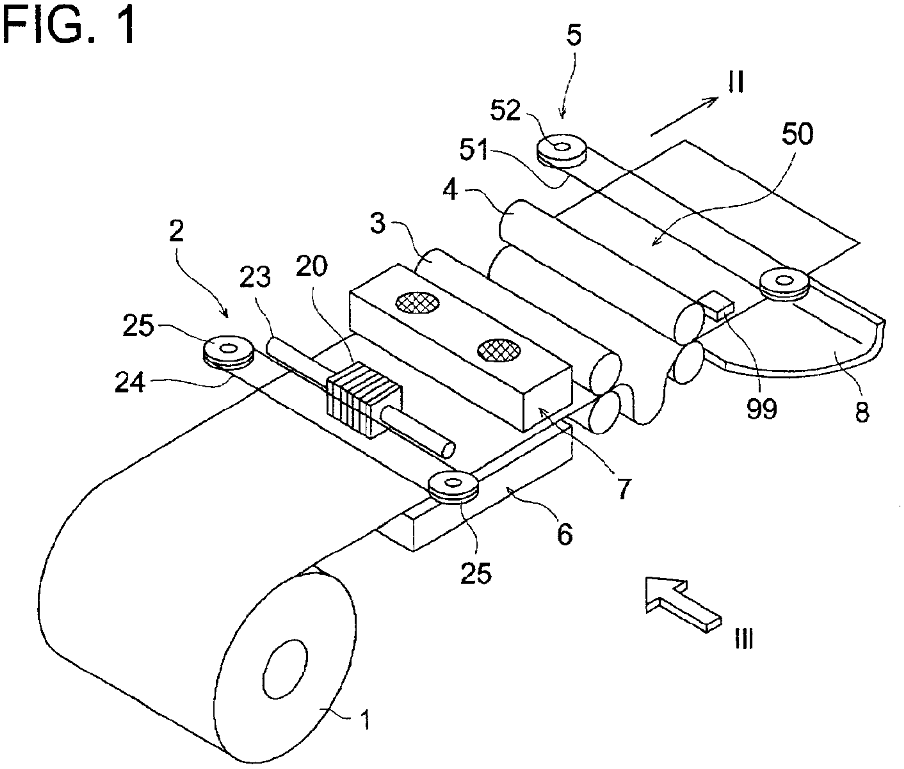
FIG. 1 is a perspective view showing the entire structure of an image forming apparatus of the first embodiment.
Figure 2:
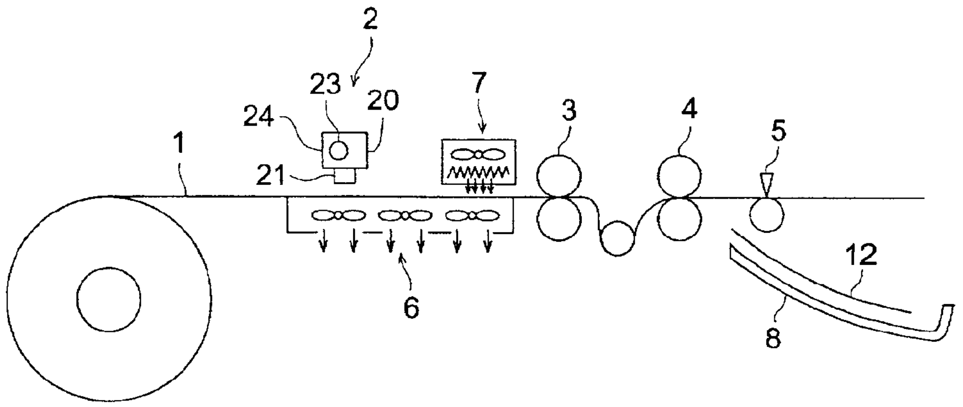
FIG. 2 is a sectional structure diagram viewed in the direction of arrow mark III in FIG. 1.

Mechanical entire structure of an example of the present embodiment will be explained as follows, referring to FIG. 1 that shows a perspective view of an entire structure of an image forming apparatus of the first embodiment and to FIG. 2 representing a sectional structure diagram viewed in the direction of arrow mark III in FIG. 1.

In the diagram, recording medium 1 wound in a roll shape is nipped and conveyed in the direction of arrow mark II by first paired rollers 3 representing a first conveyance means and by second paired rollers 4 representing a second conveyance means.

Incidentally, the first paired rollers 3 are driven by an unillustrated driving means (first roller driving motor 31 described later) and the second paired rollers 4 are driven by an unillustrated driving means (second roller driving motor 41 described later).

By driving the first paired rollers 3 and the second paired rollers 4 independently, it is possible to control recording medium conveyance for image forming and recording medium conveyance for cutting recording medium 1 independently.

On the upstream side of the first paired rollers 3, there is provided recording means 2 which jets ink covering a width of recording medium 1 for recording.

In the recording means 2, carriage 20 which jets ink to recording medium 1 is engaged movably with guide bar 23 provided in the direction of a width of recording medium 1. Pulley 25 is arranged on each of both ends of guide bar 23, and wire 24 is trained about the pulleys 25. The wire 24 is connected with carriage 20, and pulley 25 on one side is driven by an unillustrated driving means (carriage driving motor 26 described later) to be rotated.

Accordingly, the pulley 25 is driven and thereby, the carriage 20 is moved along guide bar 23.

On recording means 2, there is provided linear encoder (not shown) 97 that detects a position of the carriage 20 moving along the guide bar 23.

Further, on the downstream side of the recording means 2, there is provided ink drying means 7 that dries ink jetted on recording medium 1.

In addition, on the side opposite to an image recording surface of recording medium 1, there is provided suction means 6 that faces the recording means 2 and attracts the recording medium 1 to prevent that it is lifted in the course of image recording.

On the downstream side of the second paired rollers 4, there is provided cutting means 5.

The cutting means 5 is composed of paired pulleys 52 arranged to nip recording medium 1 in its lateral direction, wire 51 trained about the pulleys 52 and of cutter blade 50 provided on the wire 51. The pulley 52 on one side among the paired pulleys 52 is driven by an unillustrated driving means (cutter driving motor 53 described later).

Accordingly, when the pulley 52 is driven, cutter blade 50 cuts recording medium 1 while moving in the lateral direction of recording medium 1, to make sheet-shaped recording medium 12.

On the downstream side of the cutting means 5, there is provided sheet ejection tray 8 on which the cut sheet-shaped recording medium 12 is stacked.

Further, between the second paired rollers 4 and cutting means 5, there is provided cut mark detection sensor 99 that detects a cut mark representing a cutting position designating mark recorded on recording medium 1.

(Carriage 20)

Figure 3:
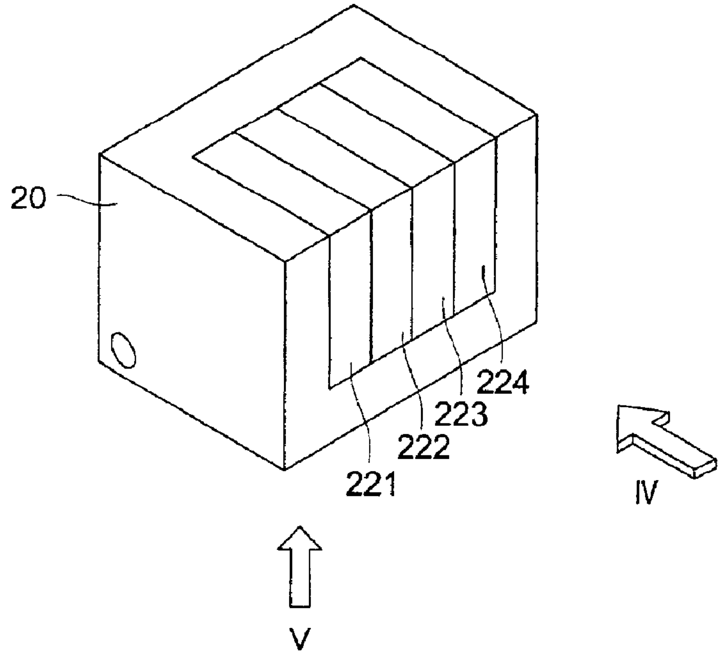
FIG. 3 is a perspective view of carriage 20 in FIG. 1.
Figure 4:
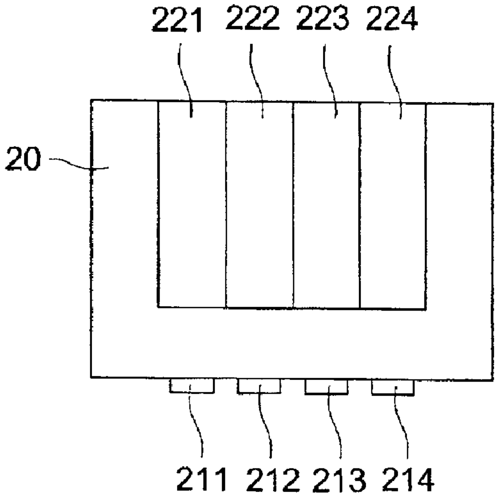
FIG. 4 is a diagram viewed in the direction of arrow mark IV.
Figure 5:
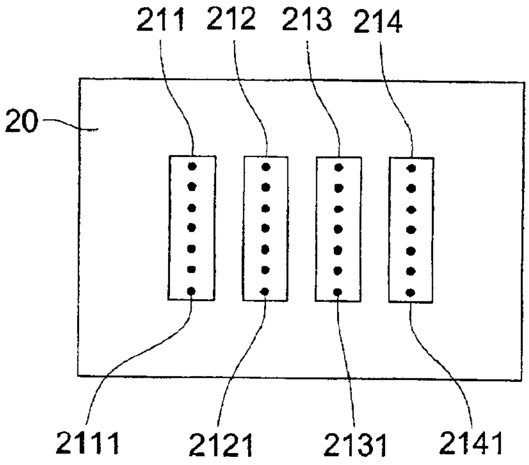
FIG. 5 is a diagram viewed in the direction of arrow mark V in FIG. 3.

Carriage 20 will be explained in detail as follows, referring to FIG. 3 representing a perspective view of the carriage 20, FIG. 4 representing a diagram viewed in the direction of arrow mark IV in FIG. 3, and FIG. 5 representing a diagram viewed in the direction of arrow mark V in FIG. 3.

On the carriage 20, there are provided Y ink tank 221, M ink tank 222, C ink tank 223 and K ink tank 224 each storing ink of each color among Y (yellow), M (magenta), C (cyan) and K (black), and are provided Y recording head 211, M recording head 212, C recording head 213 and K recording head 214 each jetting ink from each of ink tanks 222–224.

On each of recording heads 211–214, a plurality of nozzles 2111, 2121, 2131 and 2141 are provided.

(Suction Means 6)

Figure 6:
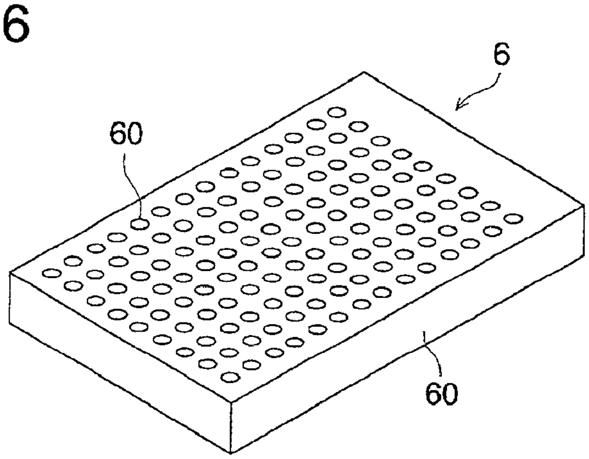
FIG. 6 is a perspective view of suction means 6 in FIG. 1.
Figure 7:
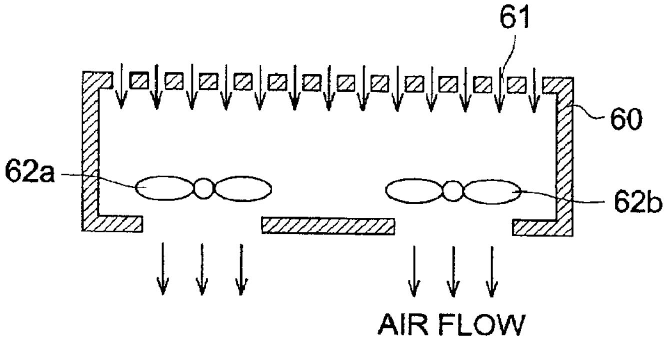
FIG. 7 is a sectional structure diagram of what is shown in FIG. 6.

Explanation will be given as follows, referring to FIG. 6 showing a perspective view of suction means 6, and FIG. 7 showing a sectional structure diagram of FIG. 6.

Suction means 6 is composed of casing 60 on which a plurality of suction holes 61 are formed at constant intervals on the surface facing recording medium 1, and of two recording medium suction fans 62*a* and 62*b* provided in the casing 60.

When the recording medium suction fans 62*a* and 62*b* are driven, negative pressure is caused inside the casing 60, thereby a recording medium is attracted to the surface where suction holes 61 are provided, thus, recording medium 1 is prevented from being lifted.

(Ink Drying Means 7)

Figure 8:
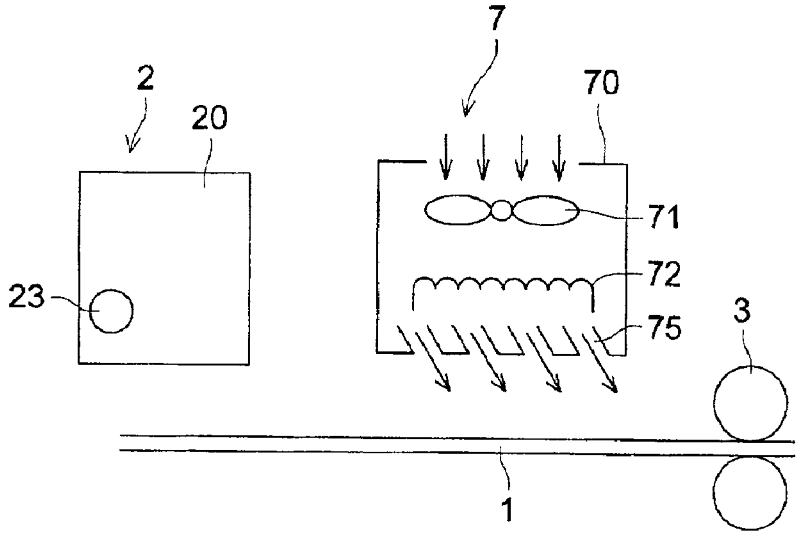
FIG. 8 is a sectional structure diagram of ink drying means 7 in FIG. 1.

Explanation will be given as follows, referring to FIG. 8 representing a sectional structure diagram of ink drying means 7.

The ink drying means 7 is composed of casing 70 on which a plurality of jetting holes 75 are formed on the surface facing recording medium 1, ink drying fan 71 that sucks air in the outside of the casing 70, and of ink drying heater 72 that heats up air sucked by ink drying fan 71.

Incidentally, in the present embodiment, the direction of jetting holes 75 is established so that an air flow jetted from jetting holes 75 may go away from carriage 20, for preventing that ink in nozzles 2111–2141 in each of recording heads 211–214 of carriage 20 is dried by dried air jetted from ink drying means 7, and a nozzle is plugged up.

(Cut Mark detection Sensor 99)

Figure 9:
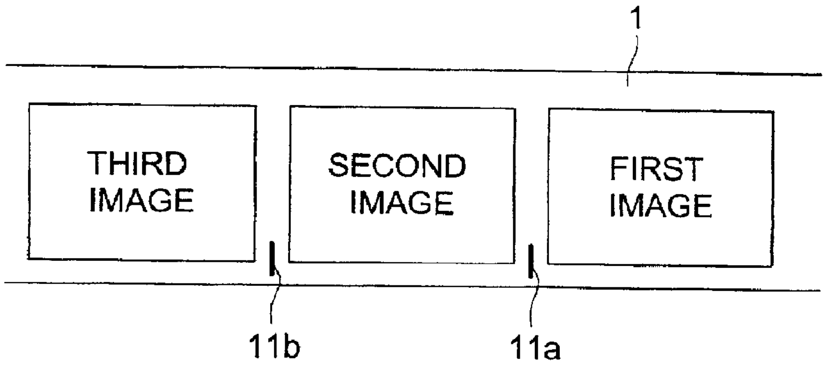
FIG. 9 is a diagram illustrating an example of a cut mark.
Figure 10:
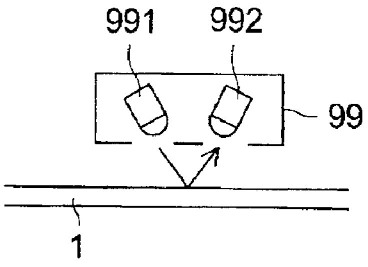
FIG. 10 is a structure diagram of cut mark detection sensor 99 in FIG. 1.

Explanation will be given as follows, referring to FIG. 9 for illustrating an example of a cut mark and to FIG. 10 representing a structure diagram of the cut mark detection sensor 99.

As shown in FIG. 9, in the present embodiment, an arrangement is made so that when recording means 2 records images on recording medium 1, cut marks 11 (11*a*, 11*b*, . . . ) are recorded between images.

As shown in FIG. 10, cut mark detection sensor 99 is composed of light-emitting diode 991 that emits light on an image recording surface of recording medium 1 and of phototransistor 992 that detects light reflected on the recording medium 1.

(Electrical Structure and Operations)

Figure 11:
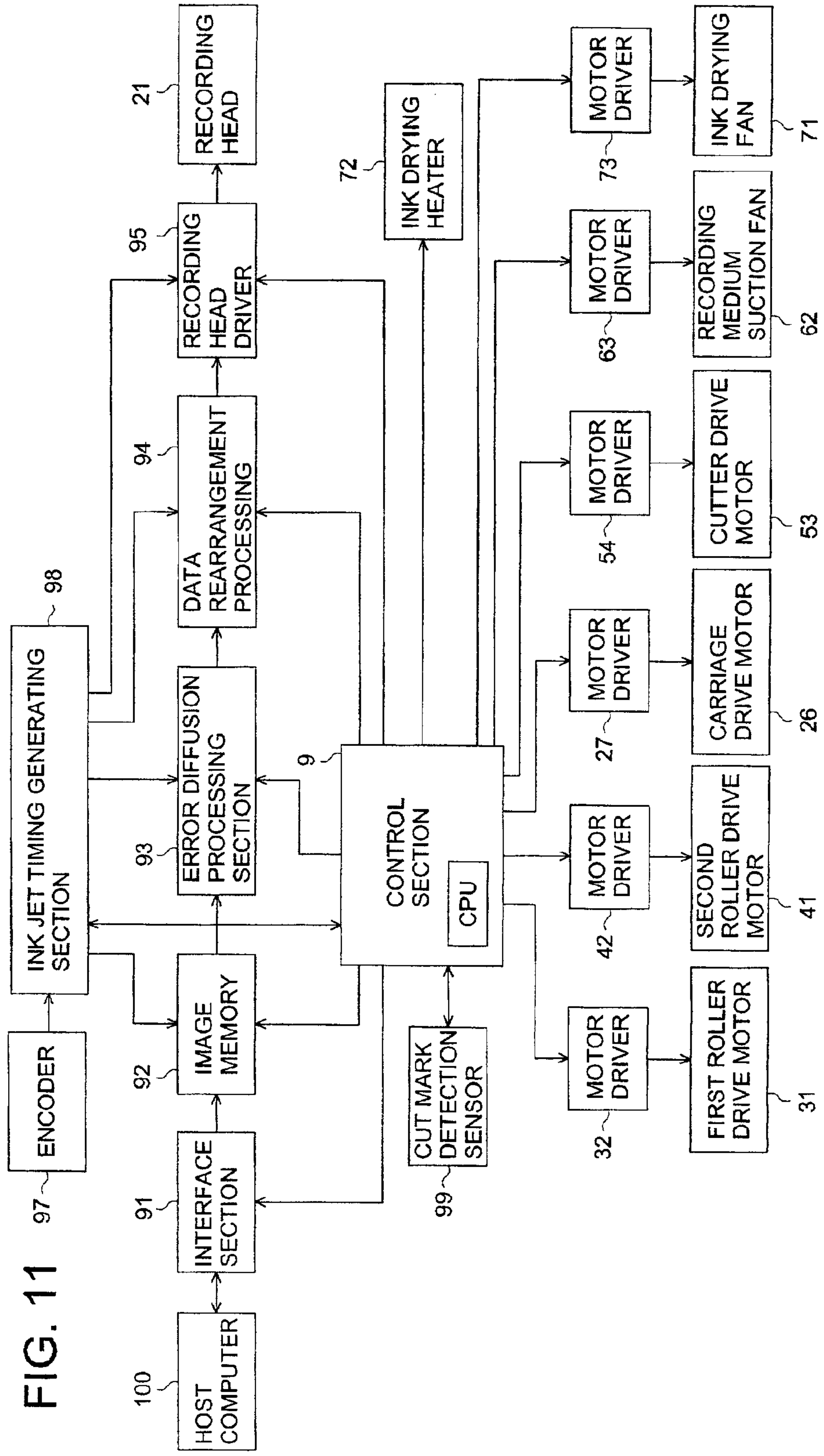
FIG. 11 is a block diagram illustrating an electrical structure of an image recording apparatus in FIG. 1.

Explanation will be given as follows, referring to FIG. 11 representing a block diagram that illustrates an electrical structure of an image recording apparatus in the present embodiment.

In the diagram, the numeral 100 represents a host computer wherein data of images (parameters such as recording sizes of images and image data subjected to color separation for YMCK) to be recorded in the image recording apparatus in the present embodiment are preserved. Image data which are sent out from the host computer 100 are taken in the image recording apparatus in the present embodiment through interface section 91.

The numeral 92 represents an image memory section that temporarily stores image data which are taken in, 93 represents an error diffusion processing section for indicating gradation of multi-valued images, 94 represents a data rearrangement processing section that transforms image data arrangement on the image memory and output sequence in image recording, and 95 represents a recording head driver that drives each of recording heads 211–214.

The numeral 98 represents an ink jet timing generating section that takes in signals from linear encoder 97, generates pulse signals of ink jet timing, and supplies to image memory 92, error diffusion processing section 93, data rearrangement processing section 94 and to recording head driver 95, while, 9 represents a control section that is composed of CPU and conducts various controls.

(Operations)

Operations will be explained as follows, referring to FIG. 11.

(1) Control section 9 writes on image memory 92 the prescribed data for recording cut mark 11, prior to image data transfer from host computer 100.

(2) Image parameters such as recording sizes concerning the first image to be recorded are transferred from host computer 100.

Image parameters are transferred to control section 9 through interface section 91.

(3) Succeeding the image parameters, host computer starts transferring the first image data. The image data are transferred to image memory 92 through interface section 91.

When a prescribed amount (equivalent to one scanning) of data are stored in image memory 92, control section 9 starts a series of operations which will be explained below.

(4) The control section 9 operates motor driver 63, and drives recording medium suction fans 62*a* and 62*b* of suction means 6.

(5) The control section 9 operates motor driver 73, and drives ink drying fan 71 to operate ink drying heater 72.

(6) The control section 9 operates motor driver 32, then, drives the first roller drive motor 31 to rotate the first paired rollers 3, and conveys recording medium 1 to the prescribed position to start recording.

(7) The control section 9 operates motor driver 27, and drives carriage drive motor 26. The carriage drive motor 26 moves carriage 20 provided with recording head 21 along guide bar 23 in the direction perpendicular to the conveyance direction for recording medium 1, through pulley 25 and wire 24.

With a movement of carriage 20, linear encoder 97 provided in the direction of the movement of carriage 20 generates a pulse signal each time the carriage 20 moves by a prescribed amount, and this pulse signal is inputted in ink jet timing generating section 98. The ink jet timing generating section 98 generates timing signals based on the pulse signal, and supplies them to image memory 92, error diffusion processing section 93, data rearrangement processing section 94 and recording head driver 95.

Due to this, data of images to be recorded are read out of image memory 92 in succession, and are inputted in recording head driver 95 through error diffusion processing section 93 and data rearrangement processing section 94, then, signals in accordance with image data are supplied to recording head 21 in synchronization with the movement of carriage 20, and ink for each of Y, M, C and K is jetted toward recording medium 1 from each of nozzles 2111–2141 provided on recording head 21, thus, an image is formed on recording medium 1.

(8) After the carriage 20 has been moved for a prescribed amount that corresponds to the size of an image to be recorded, the control section 9 stops carriage drive motor 26 to stop the carriage 20. Ink jetting also stops.

(9) The control section 9 operates motor driver 32, drives the first roller drive motor 31 to rotate the first paired rollers 3, and conveys recording medium 1 by a prescribed amount described later.

(10) When the conveyance of recording medium 1 for a prescribed amount has been completed, the control section 9 operates motor driver 27, and rotates carriage drive motor 26 in the direction opposite to that in the previous cycle so that the carriage 20 may be moved in the direction opposite to that in the previous cycle. After that, ink is jetted from a recording head in synchronization with the movement of the carriage 20 in the same way as in the previous cycle, and thereby, an image is formed on recording medium 1.

After that, the operations (8), (9) and (10) above are repeated.

(11) On the other hand, image data are transmitted from a host computer in parallel to be stored successively in image memory 92 through interface section 91. On the area in the image memory where there are already stored image data subjected to image recording, new image data are overwritten and preceding data are erased.

If image data transfer from host computer 100 is not in time, and an amount of non-recorded image data transferred and stored in image memory 92 comes to be a prescribed amount or less, control section 9 senses this and does not start a movement of carriage 20 until an amount of the stored data comes to a prescribed amount or more.

On the contrary, when image data transfer from the host computer 100 is quick, and an amount of a vacant area in the image memory comes to zero or to be not more than a prescribed amount, image data transfer from the host computer 100 is temporarily suspended until the image recording makes good progress and an amount of vacant area comes to a prescribed amount or more.

(12) When the initial image data from the host computer 100 are completely transferred, control section 9 writes in prescribed data for recording cut mark 11 to follow the end of the initial image data on the image memory 92.

(13) From the host computer 100, there are transferred the second image parameter and image data without intermission to be recorded successively on the recording medium in the same way as in the initial image.

In these processing operations mentioned above, there is inserted cut mark 11 on a boundary between the initial image and the second image. However, in the case of a movement of carriage 20 and conveyance of recording medium 1, two images are recorded continuously while being insensible of the boundary between images.

In a word, it sometimes happens that the trailing edge of the initial image, the cut mark and the leading edge of the second image are recorded by a single recording operation in (10), depending on relationship between an amount of conveyance of a recording medium and an image size.

(14) When an amount of a movement by the first paired rollers 3 for recording medium 1 comes to a prescribed amount or more, the control section 9 operates motor driver 42 to drive the second roller drive motor 41 and thereby to rotate the second paired rollers 4 so that the recording medium 1 is conveyed by a prescribed amount to the downstream side of the second paired rollers 4.

(15) When cut mark 11 is detected by cut mark detection sensor 99 while the second paired rollers 4 are rotated, the control section 9 stops the rotation of the second paired rollers 4 after rotating the second paired rollers 4 for a prescribed amount from the moment of detection of the cut mark 11, so that the cut mark 11 may come to the cutting position.

(16) The control section 9 operates motor driver 54 to drive cutter drive motor 53 so that pulley 52 is rotated to move cutter blade 50 in the direction perpendicular to the conveyance direction for recording medium 1 through wire 51, thus, the recording medium 1 is cut.

The control section 9 moves cutter blade 50 for a prescribed amount corresponding to a width of recording medium 1, and then, stops cutter drive motor 53.

(17) The recording medium 12 which has been cut is stacked on sheet ejection tray 8.

According to the controlling actions mentioned above, a slack of recording medium 1 is formed between first roller 3 and second roller 4, and cutting means 5 cuts recording medium 1 at a position being downstream relative to the slack. Therefore, when cutting the recording medium, it is possible to independently conduct the recording operation and the cutting operation without synchronizing with the recording operation conducted by the recording means, resulting in an easiness of controlling actions and a short time of processing actions.

Figure 12:
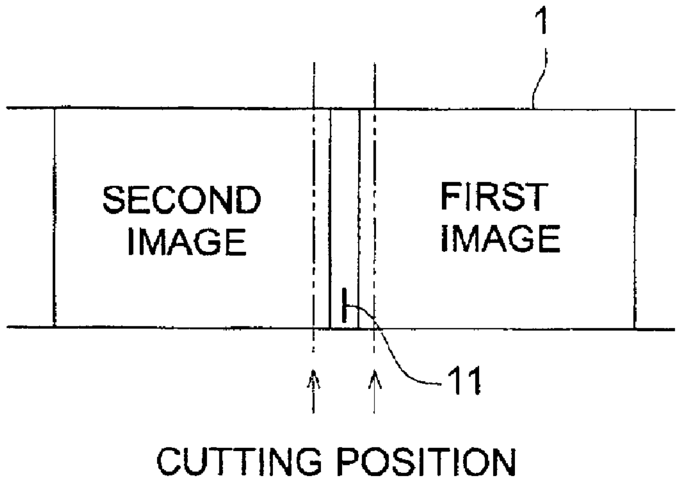
FIG. 12 is a diagram illustrating an example of cutting of a cut mark.

As shown in FIG. 12, cut mark 11 does not stay on recording medium 1 on which an image is recorded, if the recording medium 1 is cut at two positions before and behind the cut mark 11.

When cutting the recording medium 1 at two positions before and behind the cut mark 11, it is possible either to cut with one cutting means 5 for two times each time being for one position, or to cut at two positions simultaneously with two cutting means.

In this case, when cutting with one cutting means 5 for two times each time being for one position, the number of cutting blades has only to be one, resulting in low cost.

When cutting at two positions simultaneously with two cutting means, the time required for cutting can be short.

Further, when cutting at two positions, if cutting is conducted including an image, it is possible to make a print to be edgeless.

Figure 13:
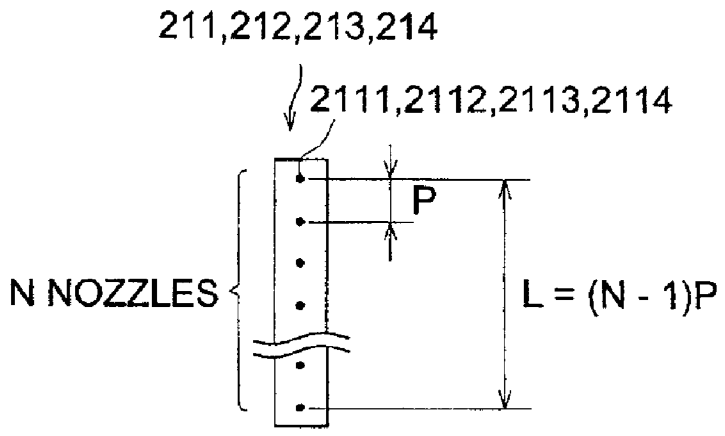
FIG. 13 is a diagram illustrating a nozzle.

Now, an amount of a single conveyance for recording medium 1 described in (9) will be explained as follows, referring to FIG. 13 showing details of nozzles 2111–2141 provided on recording head 21 and FIGS. 14 and 15 each showing a mode of conveyance amount.

FIG. 13 shows how N pieces of nozzles 2111–2141 are arranged in a pitch of p.

In FIG. 5, recording heads 211–214 each having these nozzles 2111–2141 are provided on each of 4 carriages 20 for Y, M, C and K.

Figure 14:
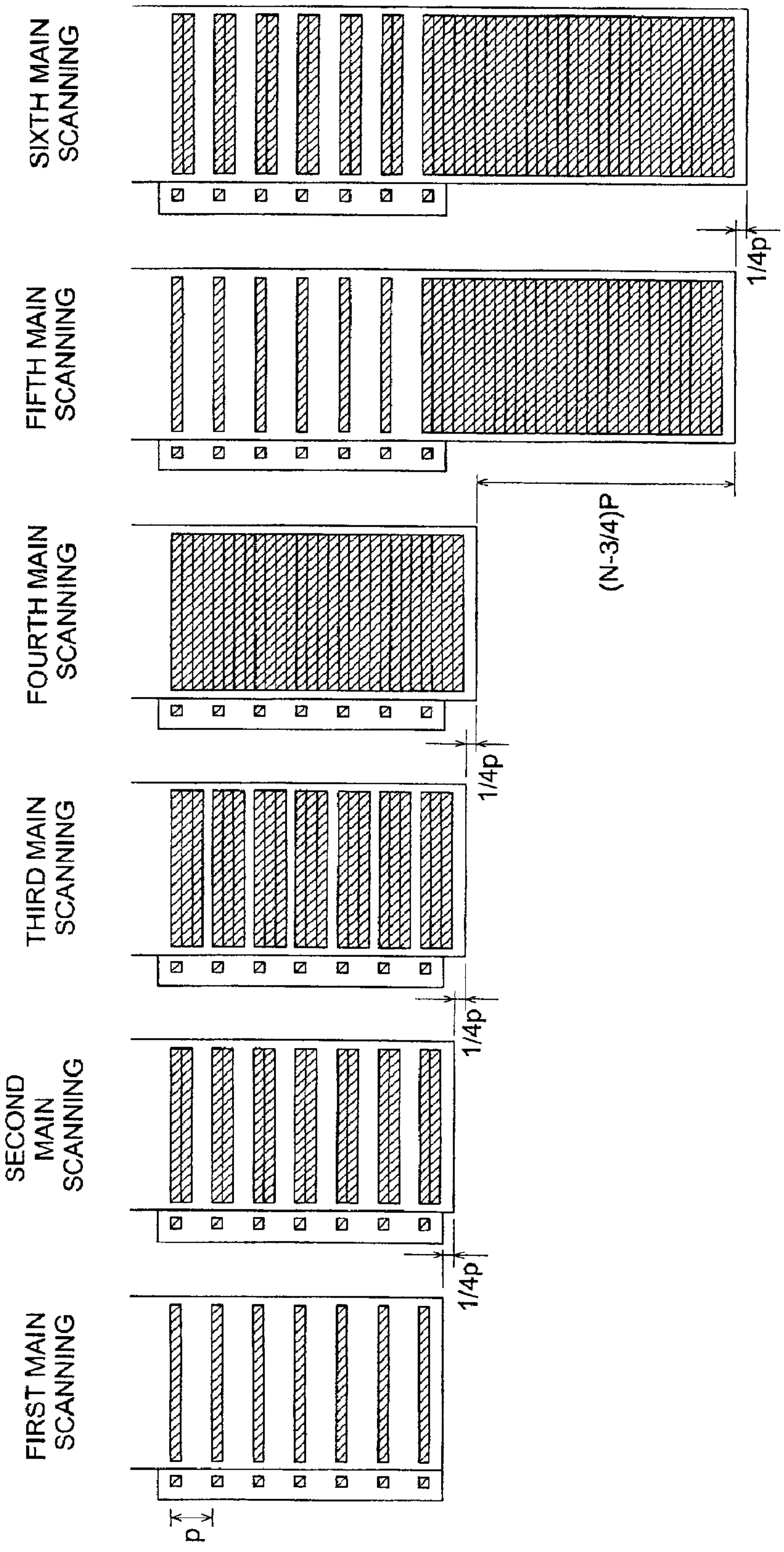
FIG. 14 is a diagram illustrating an ordinary recording system.
Figure 15:
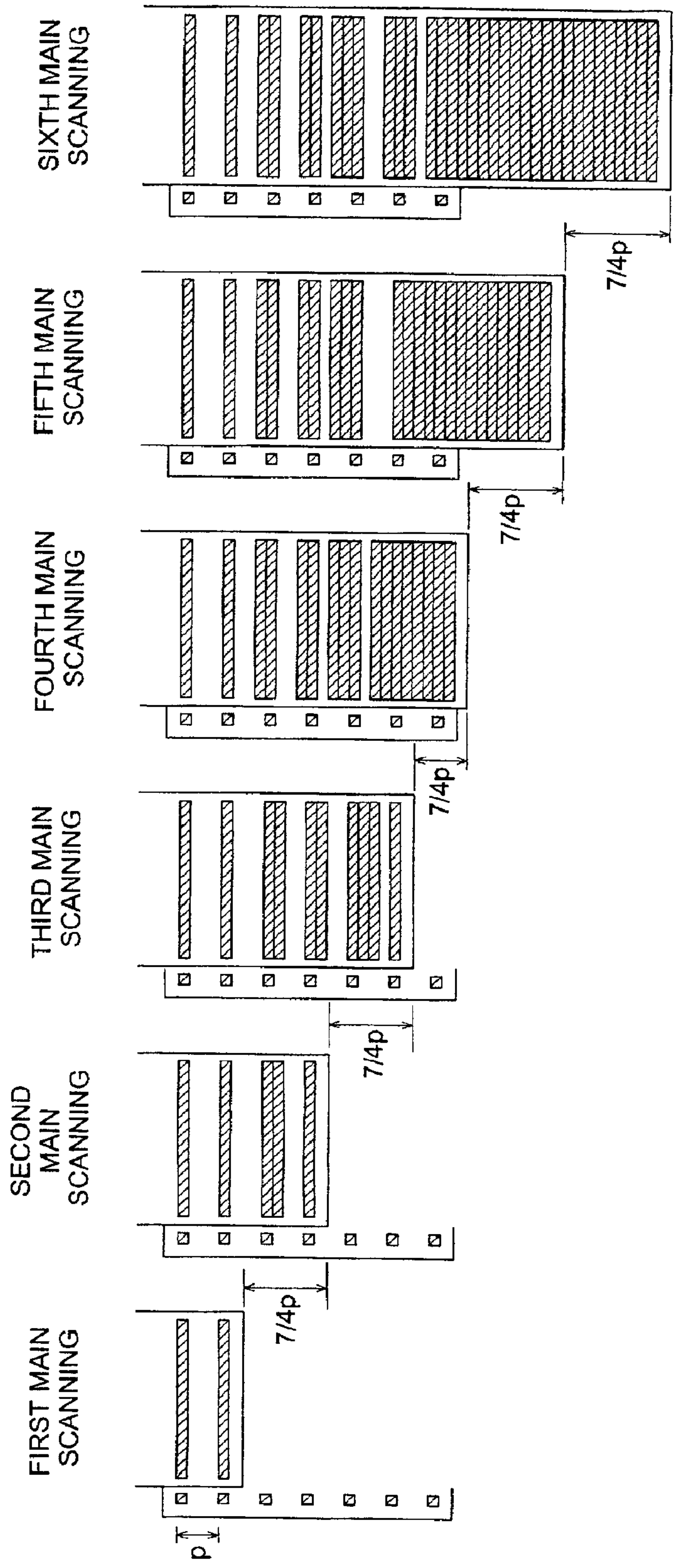
FIG. 15 is a diagram illustrating a micro-weep recording system.

Each of FIGS. 14 and 15 shows how an image is recorded with nozzles 2111–2141 shown in FIG. 13, and an occasion where the number of nozzles N is 7 and line recording density is made to be one fourth of nozzle pitch p.

FIG. 14 shows an ordinary recording system wherein recording medium 1 is conveyed by an amount of a pixel pitch at a time, and adjoining pixels are recorded by the same nozzle, and then, the recording medium is conveyed by an amount of L representing the total length of the nozzle, after all pixels between nozzles are recorded.

FIG. 15 shows a recording system called a micro-weep wherein a recording medium conveyance amount (sub-scanning amount) per a single main scanning is constant. It is characterized in that adjoining two lines are recorded by different nozzles, and when there are dispersions in an amount of ink jet and a jetting angle, an image mottle is less conspicuous than that in an ordinary recording system, which is a special feature.

In the aforesaid structure, first paired rollers (first conveyance means) 3 and second paired rollers (second conveyance means) 4 are driven and controlled independently, and thereby, it is possible to cut recording medium 1 without stopping image recording operations, resulting in shorter processing time.

Incidentally, the invention is not limited to the embodiment stated above.

(1) Though cut mark 11 is provided on the side of a recording surface of recording medium 1 by using recording means 2 in the aforesaid structure, the cut mark 11 can also be provided by using a recording means which is different from recording means 2.

In this case, even when a cut mark is provided on an image recording surface by using ink that is different in terms of type from ink used for recording means 2, for example, by using ink (invisible ink) absorbing wavelength out of visible light, an image is not affected.

Further, it is possible to provide a cut mark on the surface opposite to the image recording surface of recording medium 1 by using a recording means that is different from recording means 2, and thereby, it is possible to record information other than a cut mark, for example, information of image data, conditions for prints, the date and hour of the print and comments.

As a recording mean different from recording means 2, there are given an ink jet method, a fusion thermal transfer method, a sublimation thermal transfer method and a dot-impact method, and the invention is not limited thereto.

(2) Though cut mark 11 is provided in the course of image recording in the aforesaid structure, a cut mark can also be provided on recording medium 1 in advance, when a size of an image for recording is fixed.

(3) With regard to the cutting timing for recording medium 1, when cut mark 11 is detected by cut mark detection sensor 99 while the second paired rollers 4 are rotated, the control section 9 rotates the second paired rollers 4 for a prescribed amount from the moment of detection of the cut mark 11, so that the cut mark 11 may come to the cutting position. However, it is also possible for the control section 9 to detect an amount of conveyance for the first paired rollers 3 and to drive the second paired rollers 4 when image recording is not affected even when recording medium 1 is cut, and thereby to control the cutting timing for cutting means 5 by an amount of conveyance for the second paired rollers.

Further, a leading edge detection means that detects the leading edge of the recording medium is provided, and it is also possible for the control section 9 to detect an amount of conveyance for the first paired rollers 3 and to drive the second paired rollers 4 when image recording is not affected even when recording medium 1 is cut, and thereby to control the cutting timing for cutting means 5 based on the results of detection by the leading edge detection means.

In this case, a plurality of leading edge detection means may also be provided at different positions in accordance with a length of recording medium 1 to be cut.

The structure stated above makes the cut mark 11 to be unnecessary, which improves a fine view on a recording surface of recording medium 1 and further makes cost reduction to be attained.

(4) To prevent confusion of cut mark 11 with images, non-recording zones are provided before and behind the cut mark 11, and a distance from cut mark 11 that is immediately before the cut mark 11 is stored in the course of recording the cut mark 11, to predict that cut mark 11 appears at the position of a sensor. Cut mark 11 detected to be in the vicinity of the predicted position only is used as a standard for the cutting position, those other than that are judged to be a part of images.

An error of the position of actual detection from the predicted position for appearance of cut mark 11 is usually caused by accuracy of conveyance by rollers, and the greater a conveyance amount for a recording medium is, the greater the error is.

As an example, when an error of ±1% of a conveyance amount is caused, a conveyance error of ±1 mm is caused in conveyance for 100 mm. Therefore, when non-recording areas each being 1 mm in size are provided before and behind the cut mark, it is possible to conclude that a cut mark detected within a space of 1 mm before or behind the predicted position for appearance of the cut mark is not an image but is a cut mark.

When conveying by 200 mm, a conveyance error of ±2 mm can be caused. Therefore, when non-recording areas each being 2 mm in size are provided before and behind the cut mark, it is possible to conclude that a cut mark detected within a space of 2 mm before or behind the predicted position for the cut mark to appear is not an image but is a cut mark.

Incidentally, it is also possible to obtain the same effect even when prescribed patterns are provided in place of non-recording areas before and behind the cut mark 11, or a size of the cut mark 11 itself is changed.

By doing the foregoing, it is possible to cut surely the recording medium 1 at the position between images.

(2) Second Embodiment

Figure 16:
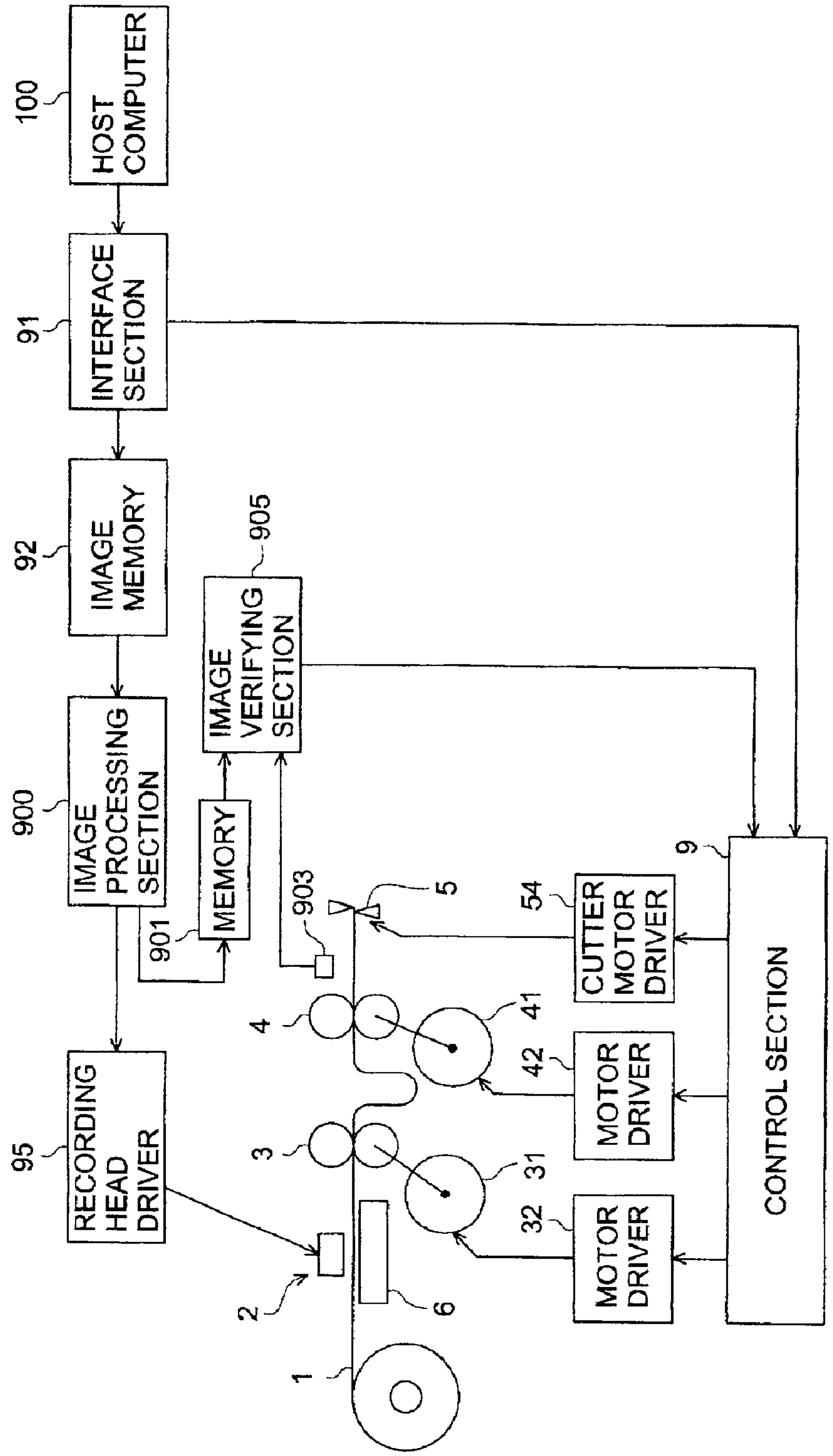
FIG. 16 is a structure diagram of an image recording apparatus in the second embodiment.

The second embodiment will be explained as follows, referring to FIG. 16 representing a structure diagram of an image recording apparatus of the second embodiment. Incidentally, parts or members in the second embodiment which are the same as those in the first embodiment are given the same symbols, and explanations for them will be omitted here to avoid needless duplication.

In the diagram, image processing section 900 conducts error diffusion processing wherein discontinuity of gradation of image data from host computer 100 is corrected, and conducts data rearrangement wherein an arrangement of image data on image memory 92 is made to agree with an order of output in image recording.

Further, data processed by image processing section 900 are sent to recording head driver 95, and data equivalent to one image are stored in memory 901.

On the downstream side of the second paired rollers 4, there is provided image pick-up element 903 such as CCD for photographing images recorded by recording means 2 on recording medium 1.

Image verifying section 905 is arranged to verify both image information on recording medium 1 picked up by image pick-up element 903 and image information (image data sent to recording means 2) stored in memory 901.

When there comes the timing to cut recording medium 1 based on information from image verifying section 905, control section 9 stops the second paired rollers 4 and drives cutting means 5 to cut recording medium 1.

Even in the case of the structure stated above, a recording medium can be cut without stopping image recording operations, which makes processing time to be short.

Incidentally, the invention is not limited to the embodiment mentioned above. Though there are provided both the first paired rollers 3 and the second paired rollers 4 in the aforesaid embodiment, the first paired rollers 3 only is also sufficient. In this case, the control section 9 controls and drives the first paired rollers 3 and cutting means 5.

(3) Third Embodiment

Figure 17:
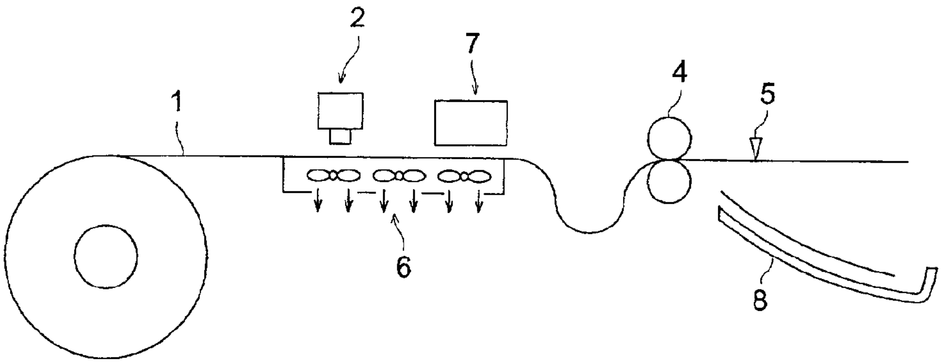
FIG. 17 is a structure diagram of an image recording apparatus in the third embodiment.

The third embodiment will be explained as follows, referring to FIG. 17 representing a structure diagram of an image recording apparatus of the third embodiment. Incidentally, parts or members in the second embodiment which are the same as those in the first embodiment are given the same symbols, and explanations for them will be omitted here to avoid needless duplication.

Though the first paired rollers 3 and the second paired rollers 4 are arranged at the downstream side of the recording means 2, the first paired rollers 3 is arranged at the upstream side of the recording means 2 and the second paired rollers 4 is arranged at the downstream side of the recording means 2 in the present embodiment.

In the case of this structure, if the suction force of suction means 6 is established so that recording medium 1 may not be slackened between the first paired rollers 3 and recording means 2, it is possible to cut recording medium 1 without stopping image recording operations to make the processing time to be short, by driving the first paired rollers (first conveyance means) 3 and the second paired rollers (second conveyance means) 4 independently on a controllable basis. Operations and effects which are the same as those in the first embodiment can be obtained.

(4) Fourth Embodiment

Figure 18:
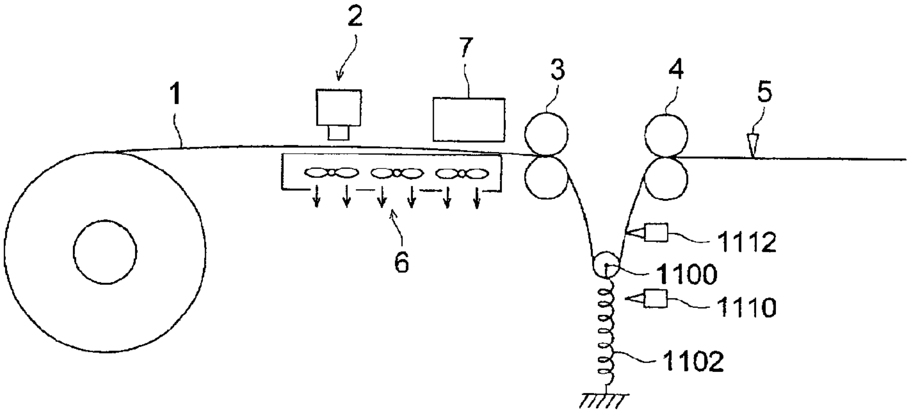
FIG. 18 is a structure diagram of an image recording apparatus in the fourth embodiment.

The fourth embodiment will be explained as follows, referring to FIG. 18 representing a structure diagram of an image recording apparatus of the fourth embodiment. Incidentally, parts or members in the second embodiment which are the same as those in the first embodiment are given the same symbols, and explanations for them will be omitted here to avoid needless duplication.

A different point between the first embodiment and the present embodiment is that, as an accumulating section, third roller 1100 is provided to be movable vertically along an unillustrated guide between the first paired rollers 3 and the second paired rollers 4 so that recording medium 1 that has passed the first paired rollers 3 is slackened through the third roller to be nipped by the second paired rollers 4.

The third roller 1100 is urged downward by urging means 1102 such as a spring.

There are provided slack amount upper limit detection sensor 1110 that detects the position of the third roller 1100 to sense that the slack of recording medium 1 arrives at the prescribed amount or more and slack amount lower limit detection sensor 1112 that senses that the slack of recording medium 1 arrives at the prescribed amount or less.

In the case of this structure, when an amount of slack comes to the upper limit or more, image recording by recording means 2 is suspended until the amount of slack is reduced to be less than the upper limit, and conveyance of recording medium 1 by the first paired rollers 3 is topped, while when an amount of slack is reduced to be less than the lower limit, cutting of recording medium 1 by cutting means 5 is suspended until the amount of slack comes to the lower limit or more, and conveyance of recording medium 1 by the second paired rollers 4 is stopped.

In the aforesaid structure again, recording medium 1 can be cut without stopping image recording operations to make the processing time to be short, by driving the first paired rollers (first conveyance means) 3 and the second paired rollers (second conveyance means) 4 independently on a controllable basis.

(5) Fifth Embodiment

Figure 19:
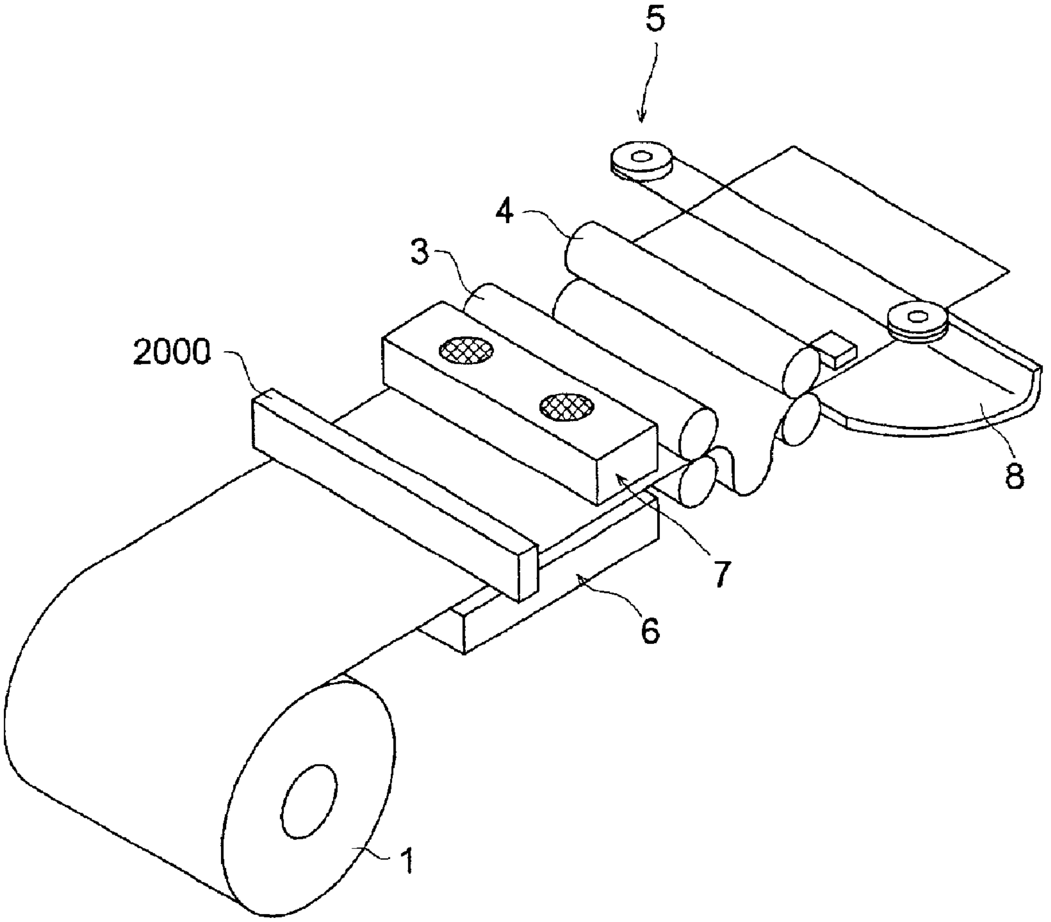
FIG. 19 is a structure diagram of an image recording apparatus in the fifth embodiment.
Figure 20:
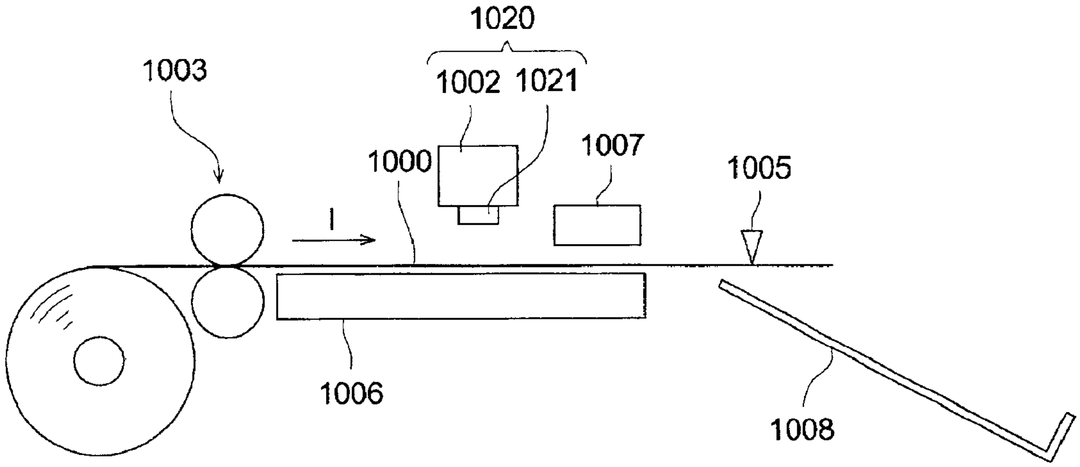
FIG. 20 is a structure diagram of a conventional image recording apparatus.

The fifth embodiment will be explained as follows, referring to FIG. 19 representing a structure diagram of an image recording apparatus of the fifth embodiment. Incidentally, parts or members in the second embodiment which are the same as those in the first embodiment are given the same symbols, and explanations for them will be omitted here to avoid needless duplication.

The point in the present embodiment which is different from the first–fourth embodiments is that linear recording head 2000 is used.

In the aforesaid structure again, recording medium 1 can be cut without stopping image recording operations to make the processing time to be short, by driving the first paired rollers (first conveyance means) 3 and the second paired rollers (second conveyance means) 4 independently on a controllable basis.

Further, when the linear recording head 2000 of this kind is used, the first paired rollers 3 can be operated in synchronization with image recording by the linear recording head 2000 and the image recording speed is not lowered, even when the second paired rollers 4 is stopped for cutting recording medium 1.

According to image recording apparatus, embodied in the present invention, the following effects can be obtained.

Because of the aforesaid arrangement wherein the conveyance means is provided between the recording medium and the cutting means, it is possible to cut the recording medium without stopping operations of the image recording, and processing time is shortened accordingly.

By applying the invention to the recording means that conducts recording by jetting ink whose output is slow, it is possible to cut the recording medium without stopping operations of the image recording, and processing time is shortened accordingly.

Because of the aforesaid arrangement wherein the cutting position control means which controls a cutting position for the cutting means is provided, it is possible to cut the recording medium without stopping operations of the image recording, and processing time is shortened accordingly.

By controlling the driving for the conveyance means with the cutting position control means, it is possible to cut the recording medium without stopping operations of the image recording, and processing time is shortened accordingly.

By controlling the cutting position with information from the cutting position detection means, it is possible to cut the recording medium without stopping operations of the image recording, and processing time is shortened accordingly.

Because of the aforesaid arrangement wherein the cutting position detection means detects an amount of conveyance of the conveyance means, and the cutting position control means controls the cutting position based on information from the cutting position detection means, it is possible to cut the recording medium without stopping operations of the image recording, and processing time is shortened accordingly.

Further, since a means to specify a cutting position on a recording medium is not needed, such means to specify the cutting position on the image recording surface of a recording medium is eliminated, thereby, the beauty on the image recording surface is not spoiled and cost reduction can further be achieved.

Because of the aforesaid arrangement wherein the cutting position detection means includes the leading edge detection means that detects the leading edge of the recording medium, and the cutting position control means controls the cutting timing for the cutting means based on results of detection by the leading edge detection means, it is possible to cut the recording medium without stopping operations of the image recording, and processing time is shortened accordingly.

Further, since a means to specify a cutting position on a recording medium is not needed, such means to specify the cutting position on the image recording surface of a recording medium is eliminated, thereby, the beauty on the image recording surface is not spoiled and cost reduction can further be achieved.

Because of a plurality of leading edge detection means provided to correspond to a size of an image to be recorded, it is possible to cut at an accurate position even for recording media each having a different size.

Because of the aforesaid arrangement wherein the cutting position control means controls the cutting position based on the results of the detection conducted by the cutting position detection means for the cutting position designating mark, it is possible to cut the recording medium without stopping operations of the image recording, and processing time is shortened accordingly.

Because of the aforesaid arrangement wherein the cutting position designating mark is recorded on the recording medium in the course of image recording, and the cutting position detection means controls the cutting position based on the results of the detection conducted by the cutting position control means for the cutting position designating mark, it is possible to cut the recording medium without stopping operations of the image recording, and processing time is shortened accordingly.

Further, by recording the cutting position designating mark in the course of image recording, it is possible to control the cutting position by conforming to a size of an image without using a specific recording medium.

Because of the aforesaid arrangement wherein the cutting position control means controls the cutting position based on the results of the detection conducted by the cutting position detection means for a cutting position supporting means recorded on the recording medium in advance, it is possible to cut the recording medium without stopping operations of the image recording, and processing time is shortened accordingly.

Further, because of the aforesaid arrangement wherein the cutting position designating mark is recorded on the recording medium in advance, it is possible to control the cutting position without requiring unnecessary time in the course of image recording.

Because of the aforesaid arrangement wherein the cutting position designating mark is a prescribed pattern that absorbs wavelengths which are out of visible light, namely is a pattern which is invisible, even a cutting position designating mark is provided on an image recording surface, an image is not affected.

When the cutting position designating mark is recorded on the side of the recording surface of the recording medium, it is possible to use the recording means, which enables cost reduction.

When the cutting position designating mark is provided on the side which is opposite to the side of the recording surface of the recording medium, an image is not affected and much information other than the cutting position designating mark can be recorded.

By recording the cutting position designating mark with the information recording means, it is possible to control the cutting position without using a specific recording medium.

Because of the aforesaid arrangement wherein the recording medium is cut at two positions before and behind the cutting position designating mark, it is possible to remove the cutting position designating mark from the recording medium on which an image has been recorded, and to make a print having no margin.

Because of the aforesaid arrangement wherein the cutting means cuts the recording medium at two positions continuously, namely, the cutting means cuts twice on a basis of one position at a time, the number of cutting blades has only to be one, which results in low cost.

Because of the aforesaid arrangement wherein the cutting means cuts the recording medium at two positions simultaneously, namely, the cutting means cuts at two positions simultaneously, the time required for cutting can be short.

The cutting position control means can conduct easily the correction of cutting positions caused by an error of an amount of conveyance for a recording medium, by changing a distance between cutting positions before and behind the cutting position designating mark in accordance with a size of an image to be recorded.

By changing in accordance with a size of an image on which at least one of a size of a cutting position designating mark, sizes of patterns provided before and behind the cutting position designating mark, and sizes of non-recording areas provided before and behind the cutting position designating mark is recorded, it is possible to cut at the position which is surely located between images.

Because of the aforesaid arrangement wherein the accumulating means that accumulates temporarily the recording medium subjected to recording, it is possible to cut the recording medium without stopping image forming operations, which shortens the processing time.

Because of the aforesaid arrangement wherein the roller provided variably in terms of position is moved in accordance with slack of a recording medium, it is possible to adjust a remaining quantity of the recording medium, and to detect how much the recording medium is slacked.

Because of the pressurizing means applying pressure on the roller provided variably in terms of position, the roller provided variably in terms of position can follow the slack of a recording medium accurately.

For example, by providing a position detection sensor that detects a position of the roller having variable positions, it is possible to detect a remaining amount.

When an amount of slack of a recording medium detected by the slack amount detection means comes to a prescribed amount or more, it is possible to prevent over slack of a recording medium in the accumulating means by suspending the recording by the recording means temporarily.

When cutting of the recording medium by the cutting means is suspended temporarily when an amount of slack of the recording medium detected by the slack amount detection means comes to a prescribed amount or less, there is no influence on recording in the recording means.

By applying the invention to the recording means that jets ink of slow output for recording, it is possible to cut a recording medium without stopping image forming operations, and processing time is shortened accordingly.

By providing the conveyance control means that controls the second conveyance means so that the recording medium may be slackened between the first conveyance means and the second conveyance means, it is possible to cut the recording medium without stopping operations of the image recording, and processing time is shortened accordingly.

Because of the conveyance control means controlling the first conveyance means, excellent images can be recorded on the recording medium.

Because of the conveyance control means that conducts the first control for controlling the first and second conveyance means so that the recording medium may be slackened between the first conveyance means and the second conveyance means, and the second control for absorbing the slack of the recording medium, it is possible to cut the recording medium without stopping operations of the image recording, and processing time is shortened accordingly.

Because of the conveyance control means that controls an amount of conveyance of the second conveyance means, it is possible to slacken the recording medium at the upstream side of the second conveyance means.

Because of the arrangement wherein the conveyance control means controls conveyance timing of the second conveyance means, a recording medium can be cut without stopping image recording operations, which makes processing time to be short.

When the invention is applied to the recording means which jets ink with slow output for recording, a recording medium can be cut without stopping image recording operations, which makes processing time to be short.

Disclosed embodiment can be varied by a skilled person without departing from the spirit and scope of the invention.

What is claimed is:

1. An image recording apparatus, comprising:

a recording device to record an image on a recording medium by emitting ink onto said recording medium;

a cutting member to cut said recording medium after said recording device records said image, said cutting member being disposed downstream in respect to said recording device in a conveying-direction of said recording medium;

a second conveyance member to convey said recording medium, said second conveyance member being disposed at a position located between said recording device and said cutting member in said conveying-direction or said recording medium; and a conveyance controller to control said second conveyance member so as to generate a slack of said recording medium at a section between said recording device and said second conveyance member in said conveying-direction of said recording medium;

wherein said conveyance controller controls a conveying-velocity of said recording medium conveyed by said second conveyance member.

2. The image recording apparatus of claim 1, wherein said conveyance controller controls a conveying-timing of said recording medium conveyed by said second conveyance member.

3. The image recording apparatus or claim 1, further comprising:

a cutting-position controller to control a cutting-position of said recording medium cut by said cutting member.

4. The image recording apparatus of claim 3, further comprising:

a cutting-position detector to detect said cutting-position of said recording medium;

wherein said cutting-position controller controls said cutting-position based on a result detected by said cutting-position detector.

5. The image recording apparatus or claim 4, wherein said cutting-position detector detects a conveying-amount of said recording medium.

6. The image recording apparatus of claim 4, wherein said cutting-position detector comprises a leading-edge detecting element for detecting a leading-edge of said recording medium.

7. The image recording apparatus of claim 6, wherein said cutting-position detector is provided with a plurality of said leading-edge detecting elements, which are arranged at different positions relative to each other, corresponding to a plurality of image sizes to be recorded on said recording medium.

8. The image recording apparatus of claim 4, wherein said cutting-position detector detects a cutting-position designating mark provided on said recording medium.

9. The image recording apparatus of claim 8, wherein said recording device records said cutting-position designating mark onto said recording medium when said recording device records said image onto said recording medium.

10. The image recording apparatus of claim 8, wherein said cutting-position designating mark is recorded on said recording medium in advance before said recording device records said image onto said recording medium.

11. The image recording apparatus of claim 8, wherein said cutting-position designating mark is a pattern having a property of absorbing invisible wavelengths.

12. The image recording apparatus at claim 8, wherein said cutting-position designating mark is provided on a recording surface of said recording medium on which said image can be recorded.

13. The image recording apparatus of claim 8, wherein said cutting-position designating mark is provided on a surface opposite to a recording surface of said recording medium, on which said image can be recorded.

14. The image recording apparatus of claim 8, further comprising:

an information recording device to record said cutting-position designating mark onto said recording medium.

15. The image recording apparatus of claim 8, wherein said cutting member cuts said recording medium at two positions before and behind said cutting-position designating mark.

16. The image recording apparatus of claim 15, wherein said cutting-position-controller controls an interval distance between said two positions cut by said cutting member, corresponding to said image sizes to be recorded on said recording medium.

17. The image recording apparatus of claim 8, wherein at least one of factors, including dimensions of said cutting-position designating mark, dimensions of patterns provided before and behind said cutting-position designating mark and dimensions non-recording areas provided before and behind said cutting-position designating mark, is controlled corresponding to image sizes to be recorded on said recording medium.

18. An image recording apparatus, comprising:

a recording device to record an image on a recording medium by emitting ink onto said recording medium;

a cutting member to cut said recording medium after said recording device records said image; and an accumulating section to temporarily accumulate said recording medium on which said image is already recorded by said recording device, said accumulating section being disposed at a position located between said recording device and said cutting member;

wherein said accumulation section comprises an accumulating amount detector to detect an accumulating of said recording medium accumulated at said accumulating section and an operation of recording said image onto said recording medium by said recording device is temporarily stopped when said accumulating amount detector detects that said accumulating amount of recording medium is larger than a first predetermined amount.

19. An image recording apparatus, comprising:

a recording device to record an image on a recording medium by emitting ink onto said recording medium;

a cutting member to cut said recording medium after said recording device records said image, said cutting member being disposed downstream in respect to said recording device in a conveying-direction of said recording medium;

a second conveyance member to convey said recording medium, said second conveyance member being disposed at a position located between said recording device and said cutting member in said conveying-detection of said recording medium; and a conveyance controller to control said second conveyance member so as to generate a slack of said recording medium at a section between said recording device and said second conveyance member in said conveying-direction of said recording medium;

a cutting-position controller to control a cutting-position of said recording medium cut by said cutting member;

a cutting-position detector to detect said cutting-position of said recording medium;

wherein said cutting-position controller controls said cutting-position based on a result detected by said cutting-position detector;

said cutting-position detector detects a cutting-position designating mark provided on said recording medium;

said cutting member cuts said recording medium at two positions before and behind said cutting-position designating mark;

and said cutting member continuously cuts said recording medium at said two positions.

20. An image recording apparatus, comprising:

a recording device to record an image on a recording medium by emitting ink onto said recording medium;

a cutting member to cut said recording medium after said recording device records said image, said cutting member being disposed downstream in respect to said recording device in a conveying-direction of said recording medium;

a second conveyance member to convey said recording medium, said second conveyance member being disposed at a position located between said recording device and said cutting member in said conveying-direction of said recording medium; and a conveyance controller to control said second conveyance member so as to generate a slack of said recording medium at a section between said recording device and said second conveyance member in said conveying-direction of said recording medium;

a cutting-position controller to control a cutting-position of said recording medium cut by said cutting member;

a cutting-position detector to detect said cutting-position of said recording medium;

wherein said cutting-position controller controls said cutting-position based on a result detected by said cutting-position detector;

said cutting-position detector detects a cutting-position designating mark provided on said recording medium;

said cutting member cuts said recording medium at two positions before and behind said cutting-position designating mark;

and said cutting member simultaneously cuts said recording medium at said two positions.

21. An image recording apparatus, comprising:

a recording device to record an image on a recording medium by emitting ink onto said recording medium;

a cutting member to cut said recording medium after said recording device records said image, said cutting member being disposed downstream in respect to said recording device in a conveying-direction of said recording medium;

a second conveyance member to convey said recording medium, said second conveyance member being disposed at a position located between said recording device and said cutting member in said conveying-direction of said recording medium; and a conveyance controller to control said second conveyance member so as to generate a slack of said recording medium at a section between said recording device and said second conveyance member in said conveying-direction of said recording medium;

a cutting-position controller to control a cutting-position of said recording medium cut by said cutting member;

a cutting-position detector to detect said cutting-position of said recording medium;

wherein said cutting-position controller controls said cutting-position based on a result detected by said cutting-position detector;

said cutting-position detector detects a cutting-position designating mark provided on said recording medium;

and a time when said cutting-position detector detects said cutting-position designating mark is predicted in advance, and said cutting member cuts said recording medium when said cutting-position detector detects said cutting-position designating mark at said time predicted in advance.

22. An image recording apparatus, comprising:

a recording device to record an image on a recording medium by emitting ink onto said recording medium;

a cutting member to cut said recording medium after said recording device records said image; and an accumulating section to temporarily accumulate said recording medium on which said image is already recorded by said recording device, said accumulating section being disposed at a position located between said recording device and said cutting member;

wherein said accumulating section comprises an accumulating amount detector to detect an accumulating amount of said recording medium accumulated at said accumulating section;

and an operation of cutting said recording medium by said cutting member is temporarily stopped when said accumulating amount detector detects that said accumulating amount of said recording medium is less than a second predetermined amount.

23. An image recording apparatus, comprising:

a recording device to record an image on a recording medium by emitting ink onto said recording medium;

a cutting member to cut said recording medium after said recording device records said image, said cutting member being disposed downstream in respect to said recording device in a conveying-direction of said recording medium;

a second conveyance member to convey said recording medium, said second conveyance member being disposed at a position located between said recording device and said cutting member in said conveying-direction or said recording medium;

a conveyance controller to control said second conveyance member so as to generate a slack of said recording medium at a section between said recording device and said second conveyance member in said conveying-direction of said recording medium; and a first conveyance member to convey said recording medium, said first conveyance member being disposed upstream in respect to said second conveyance member in said conveying-direction of said recording medium;

wherein then said conveyance controller controls said first conveyance member and said second conveyance member so as to eliminate said slack of said recording medium;

and said recording device records an image onto said recording media then said recording medium is moved by a predetermined amount by the first conveyance member.

24. The image recording apparatus of claim 23, wherein said conveyance controller controls a conveying-velocity of said recording medium conveyed by said second conveyance member.

25. The image recording apparatus of claim 23, wherein said conveyance controller controls a conveying-timing of said recording medium conveyed by said second conveyance member.

26. The image recording apparatus of claim 23, further comprising:

a cutting-position controller to control a cutting-position of said recording medium cut by said cutting member.

27. The image recording apparatus of claim 26, further comprising:

a cutting-position detector to detect said cutting-position of said recording medium;

wherein said cutting-position controller controls said cutting-position based on a result detected by said cutting-position detector.

28. The image recording apparatus of claim 27, wherein said cutting-position detector detects a conveying-amount of said recording medium.

29. The image recording apparatus of claim 27, wherein said cutting-position detector comprises a leading-edge detecting element for detecting a leading-edge of said recording medium.

30. The image recording apparatus of claim 29, wherein said cutting-position detector is provided with a plurality of said leading-edge detecting elements, which are arranged at different positions relative to each other, corresponding to a plurality of image sizes to be recorded on said recording medium.

31. The image recording apparatus of claim 27, wherein said cutting-position detector detects a cutting-position designating mark provided on said recording medium.

32. The image recording apparatus of claim 31, wherein said recording device records said cutting-position designating mark onto said recording medium when said recording device records said image onto said recording medium.

33. The image recording apparatus of claim 31, wherein said cutting-position designating mark is recorded on said recording medium in advance before said recording device records said image onto said recording medium.

34. The image recording apparatus of claim 31, wherein said cutting-position designating mark is a pattern having a property of absorbing invisible wavelengths.

35. The image recording apparatus of claim 31, wherein said cutting-position designating mark is provided on a recording surface of said recording medium, on which said image can be recorded.

36. The image recording apparatus of claim 31, wherein said cutting-position designating mark is provided on a surface opposite to a recording surface of said recording medium on which said image can be recorded.

37. The image recording apparatus of claim 31, further comprising:

an information recording device to record said cutting-position designating mark onto said recording medium.

38. The image recording apparatus of claim 31, wherein said cutting member cuts said recording medium at two positions before and behind said cutting-position designating mark.

39. The image recording apparatus of claim 38, wherein said cutting member continuously cuts said recording medium at said two positions.

40. The image recording apparatus of claim 38, wherein said cutting member simultaneously cuts said recording medium at said two positions.

41. The image recording apparatus of claim 38, wherein said cutting-position controller controls an interval distance between said two positions cut by said cutting member, corresponding to said image sizes to be recorded on said recording medium.

42. The image recording apparatus of claim 38, wherein at least one of factors, including dimensions of said cutting-position designating mark, dimensions of patterns provided before and behind said cutting-position designating mark and dimensions of non-recording areas provided before and behind said cutting-position designating mark, is controlled corresponding to image sizes to be recorded on said recording medium.

43. The image recording apparatus of claim 38, wherein a time when said cutting-position detector detects said cutting-position designating mark is predicted in advance, and said cutting member cuts said recording medium when said cutting-position detector detects said cutting-position designating mark at said time predicted in advance.

44. An image recording apparatus, comprising:

a recording device to record an image on a recording medium by emitting ink onto said recording medium;

a cutting member to cut said recording medium after said recording device records said image;

an accumulating section to temporarily accumulate said recording medium on which said image is already recorded by said recording device, said accumulating section being disposed at a position located between said recording device and said cutting member; and a first conveyance member to convey said recording medium, said first conveyance member being disposed upstream in respect to said second conveyance member in said conveying-direction of said recording medium;

wherein then said conveyance controller controls said first conveyance member and said second conveyance member so as to eliminate said slack of said recording medium and said recording device records an image onto said recording media then said recording medium is moved by a predetermined amount by the first conveyance member.

45. An image recording apparatus of claim 44, wherein said accumulating section comprises a fixed roller disposed at a stationary position to convey said recording medium and a movable roller moving in a variable position to apply a tension to a slack of said recording medium accumulated at said accumulating section.

46. An image recording apparatus of claim 45, wherein said accumulating section further comprises a forcing element to force said movable roller.

47. An image recording apparatus of claim 44, wherein said accumulating section comprises an accumulating amount detector to detect an accumulating amount or said recording medium accumulated at said accumulating section.

48. An image recording apparatus of claim 47, wherein an operation of recording said image onto said recording medium by said recording device is temporally stopped when sad accumulating amount detector detects that said accumulating amount of said recording medium is larger than a first predetermined amount.

49. An image recording apparatus of claim 47, wherein an operation of cutting said recording medium by said cutting member is temporarily stopped when said accumulating amount detector detects that said accumulating amount of said recording medium is less than a second predetermined amount.

* * * * *